(12) United States Patent
Gray

(10) Patent No.: US 6,769,262 B1
(45) Date of Patent: Aug. 3, 2004

(54) CHILLING SLEEVE FOR EXPANSION-FITTING HOLLOW CYLINDERS

(75) Inventor: Luke George Mark Gray, Waterloo (CA)

(73) Assignee: Babcock & Wilcox Canada Ltd., Ontario (CA)

( * ) Notice: Subject to any disclaimer, the term of this patent is extended or adjusted under 35 U.S.C. 154(b) by 0 days.

(21) Appl. No.: 10/367,242

(22) Filed: Feb. 13, 2003

(51) Int. Cl.[7] .............. F25D 25/00; F25D 3/00; F17C 9/02; B23P 11/02
(52) U.S. Cl. .............. 62/62; 29/447; 62/293; 62/50.2
(58) Field of Search .......... 62/62, 56.2, 293, 62/457.9; 29/447

(56) References Cited

U.S. PATENT DOCUMENTS

| | | | |
|---|---|---|---|
| 1,955,728 A | * | 4/1934 | Allen et al. ............ 29/447 |
| 1,980,156 A | * | 11/1934 | Emrick ............ 29/447 |
| 2,647,847 A | | 8/1953 | Black et al. |
| 3,146,608 A | * | 9/1964 | Carpenter ............ 62/293 |
| 3,626,706 A | * | 12/1971 | Elsner ............ 62/62 |
| 3,900,939 A | | 8/1975 | Greacen |
| 3,977,068 A | | 8/1976 | Krips |
| 4,284,475 A | | 8/1981 | Anthony |
| 4,305,203 A | | 12/1981 | Bock et al. |
| 4,416,848 A | | 11/1983 | Feutrel |
| 4,573,248 A | * | 3/1986 | Hackett ............ 29/423 |
| 5,205,038 A | | 4/1993 | Archer et al. |
| 5,365,750 A | * | 11/1994 | Greenthal ............ 62/293 |
| 5,516,999 A | | 5/1996 | Fournier |
| 5,700,988 A | | 12/1997 | Fournier |

* cited by examiner

Primary Examiner—William C. Doerrler
(74) Attorney, Agent, or Firm—Michael J. Seymour; Kathryn W. Grant; Eric Marich

(57) ABSTRACT

A chilling sleeve is provided for insertion into a hollow cylinder, such as a control rod driving mechanism guide tube, for adjusting the temperature and therefore the diameter of the cylinder. The chilling sleeve has external inlet and outlet ports, regulated by a pump. The pump injects high pressure liquid coolant, such as liquid nitrogen into the inlet port and through channels in the body of the sleeve out to a high pressure chamber. The liquid coolant escapes the high pressure chamber via escapes holes and enters a low pressure chamber, bordered by the outer wall of the hollow cylinder. In the lower pressure chamber, the liquid coolant evaporates, which chills the adjacent outer wall of the hollow cylinder, thereby shrinking the outer wall so that the hollow cylinder can be fitted into or removed from a cylindrical hole, for example a closure head hole in a vessel head of a nuclear reactor.

18 Claims, 3 Drawing Sheets

CHILLING SLEEVE FOR EXPANSION-FITTING HOLLOW CYLINDERS

FIELD AND BACKGROUND OF INVENTION

The present invention relates generally to the field of installing hollow cylinders into cylindrical bores or openings, and in particular to a portable chilling sleeve for cooling control rod drive mechanism (CRDM) guide tube nozzles so that the diameter of the tubes can be shrunk locally and expansion fitted into a hole within a nuclear reactor vessel head.

A pressurized water nuclear reactor is divided into a lower reactor vessel with a reactor core and an upper control rod assembly, part of which can be lowered into the reactor vessel for controlling the reaction rate of the nuclear reactor. The control rod assembly contains a vertical nozzle which penetrates the upper cover of the vessel, or closure head, and houses extensions of a control rod, that can be lifted or lowered by a control rod drive mechanism ("CRDM"), which generally operates by some combination of electrical, electromechanical, hydraulic, or pneumatic motors or drivers.

The vertical nozzle, also called a CRDM guide tube or ("CGT"), is fitted into the smaller holes of the closure head, for example by the method disclosed in U.S. Pat. No. 5,516,999 to Fournier. Fournier '999 teaches a method of immersing and shrinking an adapter, in a bath of liquid nitrogen, and then removing the adapter from the bath and inserting it into a hole in a vessel cover, which is slightly smaller than the nominal outside diameter of the adapter at ambient temperature. After the adapter warms, it expands fitting tightly within the hole.

U.S. Pat. No. 5,205,038 teaches a method of extracting a tube with a cooling coil and liquid nitrogen. The cooling coil and liquid nitrogen are introduced into the tube. The tube, which is engaged at its bottom end within a nipple, becomes disengaged after the cooling coil and liquid nitrogen cool the tube and cause thermal retraction of the tube.

U.S. Pat. No. 3,900,939 to Greacen suggests a method for plugging large diameter tubes by cooling the plug such that its diameter is sufficiently contracted to be received within the tube. Returning the plug to ambient temperature causes the plug to thermally expand to a tight fit within the tube.

U.S. Pat. No. 4,284,475 to Anthony discloses a method of installing a wear sleeve for a guide tube in a nuclear fuel assembly. The sleeve is suspended at the upper end of the guide tube. The lower portion of the sleeve is expanded into intimate contact with the guide tube. Finally, the sleeve is mechanically secured to the guide tube by a crimp, in which the sleeve and guide tube are permanently deformed, providing an interference fit between the sleeve and the tube.

U.S. Pat. No. 3,977,068 to Krips discloses a method of expanding a tubular body through the application of high pressure by means of a pressure fluid. A tube, having an outer diameter somewhat smaller than the diameter of the anchoring bore of a tube plate, can be inserted into the tube plate, and pressurized with fluid, until the length portion of the tube is expanded and there is a swaged engagement between the tube and the anchoring bore.

Although methods are generally known for providing an interference fit between two objects by adjusting pressure and temperature, portable refrigeration means are not known for nuclear fuel assembly members such as control rod guide tubes. In the industry, a CGT is bathed in a barrel of liquid nitrogen at a remote location and is then moved quickly from the liquid nitrogen bath to the closure head hole by high speed crane or manipulator. Then the CGT is dropped into the closure head or vessel cover hole. This operation must generally be performed within thirty seconds.

Therefore, it is necessary to provide a portable means of freezing a CGT so that it can be frozen locally at the point that it will reside, eliminating the need for liquid nitrogen barrels in the work area, which can be unsafe. The need for transporting a CGT quickly can also be eliminated. A portable means of freezing is also needed for removing a CGT from a closure head hole since the interference fit with the closure head hole can be reversed by a reduction in the size of the CGT.

SUMMARY OF INVENTION

It is an object of the present invention to provide a portable refrigerator which can be locally inserted into a hollow cylinder, such as a control rod drive mechanism guide tube.

Another object of the present invention is to provide a portable refrigerator which can accept high pressure liquefied gas, such as liquid nitrogen or other cryogenic liquid, or liquid carbon dioxide, and convert the liquefied gas to a gaseous fluid.

A further object of the present invention is to provide a portable refrigerator that can freeze and shrink the outside diameter of a control rod drive mechanism guide tube, so that it can be placed within a closure head hole having a smaller diameter than the diameter of the guide tube at ambient temperature. When the refrigerator is turned off, the guide tube warms up and an interference fit is established between the guide tube and the closure head hole.

Yet another object of the present invention is to provide a portable refrigerator that can freeze and shrink a control rod drive mechanism guide tube, so that it can be removed from the interference fit established between the guide tube and the closure head hole.

Accordingly, a chilling sleeve is provided, which is directly attached to a pump to accept a pressurized liquefied gas. The chilling sleeve is small enough that it can be inserted into a control rod drive mechanism guide tube. The chilling sleeve has high pressure and low pressure chambers so that when the liquefied gas is released through the pump, it will flow to the high pressure chamber, and can then escape through holes into a low pressure chamber surrounded by an outer wall of the guide tube, where the liquefied gas will rapidly expand into a gas that can be evacuated at a controllable rate, thereby governing the temperature of the outer wall of the guide tube. A lifting device is also provided for removing the chilling sleeve once the guide tube has been frozen and fitted or removed from a closure head hole.

In one embodiment the invention comprises a portable chilling sleeve for controlling the temperature of a hollow cylinder having an outer wall and an inner surface, thereby adjusting the size of the diameter of the outer wall. The chilling sleeve includes an upper body having a sleeve leg insertable into the hollow cylinder. The upper body also has inlet and outlet ports. A higher pressure chamber is formed within the sleeve leg and is in fluid communication with the inlet port. A lower pressure chamber is formed in operation between the sleeve leg and the inner surface of the hollow cylinder. The lower pressure chamber is separated from the higher pressure chamber by escape holes in the sleeve leg and is in fluid communication with the outlet port. The embodiment further includes pump means for regulating intake into the inlet port and exhaust out of the outlet port, wherein the rate of exhaust release controls the temperature and size of the outer wall of said hollow cylinder.

In another embodiment the invention comprises a portable chilling sleeve for reversibly reducing the outside diameter of a control rod drive mechanism guide tube, the guide tube having an inner wall with an inner surface. The chilling sleeve includes an upper body having a sleeve leg insertable into the guide tube. The body also has an inlet port in fluid communication with an inlet channel within the body. The inlet channel is connected to a higher pressure chamber surrounded by the sleeve leg. A lower pressure chamber is located in operation between the sleeve leg and the inner surface of the guide tube. The lower pressure chamber is separated from the higher pressure chamber by escape holes and is in fluid communication with an outlet port in the upper body. The embodiment further includes pump means for regulating intake into said inlet port and exhaust out of said outlet port, wherein said rate of exhaust release controls the size of the outside diameter of said guide tube.

In yet another embodiment the invention comprises a method of inserting a control rod drive mechanism guide tube through a hole in the closure head of a reactor pressure vessel. The hole has a hole diameter. The guide tube has an outer wall with an inner surface and has an outer diameter greater than the hole diameter. The method includes providing a chilling sleeve with an upper body having a sleeve leg insertable into the guide tube. The upper body has an outlet port. The upper body also has an inlet port in fluid communication with a higher pressure chamber within the sleeve leg. The sleeve leg has a projection surrounded by a first o-ring seal, and an end cap surrounded by a second o-ring seal. The sleeve leg also has escape holes located between the first and second o-ring seals adjacent the end cap. The chilling sleeve is inserted into the guide tube to form a lower pressure chamber between the sleeve leg and the inner surface of the guide tube. The lower pressure chamber is in fluid communication with the higher pressure chamber via the escape holes and in fluid communication with the outlet port. A liquefied gas is introduced into the higher pressure chamber via the inlet port and is directed into the -lower pressure chamber via the sleeve leg escape holes. The liquefied gas evaporates in the lower pressure chamber to form a gaseous fluid thereby cooling the inner surface of the guide tube and reducing the outer diameter of the guide tube to a size less than the hole diameter. The gaseous fluid is discharged from the lower chamber via the outlet port and the guide tube is inserted into the hole in the closure head.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
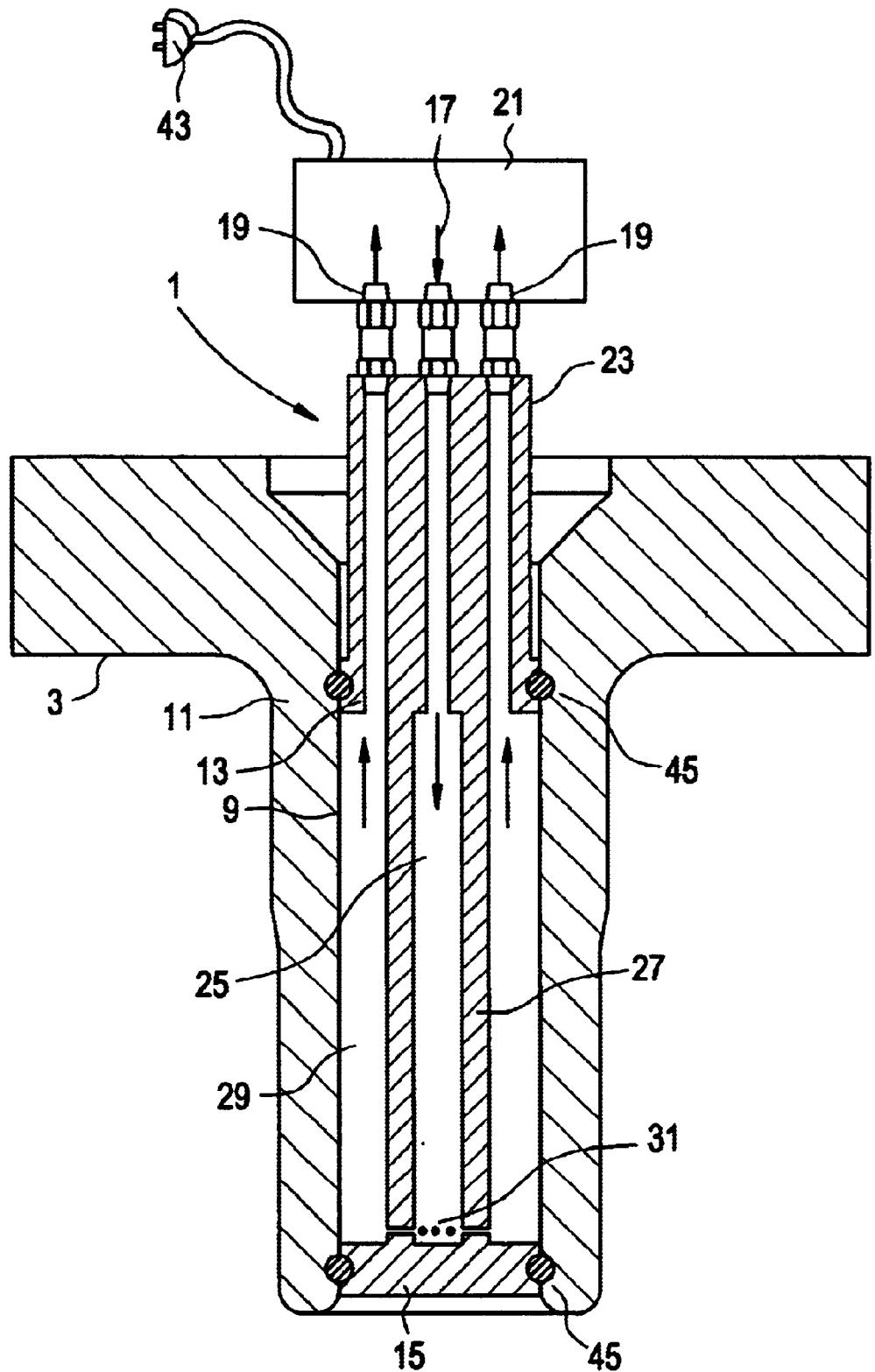
FIG. 1 is a side cross-sectional view of a chilling sleeve inserted into a control rod drive mechanism guide tube.
Figure 2:
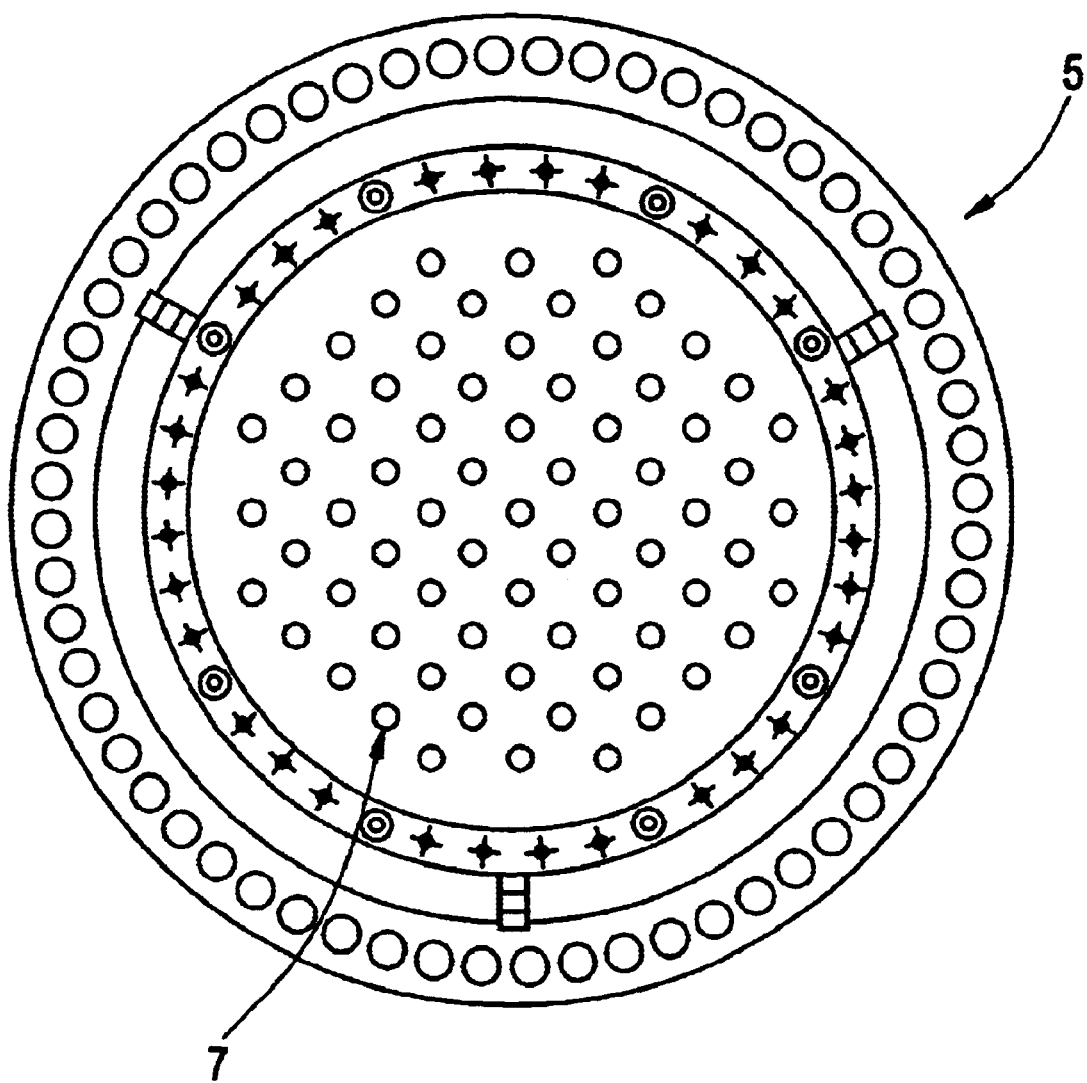
FIG. 2 a top plan view of a closure head.

Referring now to the drawings, in which like reference numerals are used to refer to the same or similar elements, FIG. 1 shows chilling sleeve 1 inserted into a hollow cylinder such as the lower portion of a control rod drive mechanism guide tube 3 ("CGT"). The CGT 3 is a T-shaped nozzle or adapter that houses the control rod drive mechanism ("CRDM"). A plurality of such nozzles penetrate a reactor vessel through a closure head 5. The closure head 5, shown in FIG. 2, is the upper cover of a reactor vessel, which contains multiple inner closure head holes 7 through which the CGT nozzles may penetrate the reactor vessel.

As shown in FIG. 1, the chilling sleeve 1 is situated within the CGT 3 and makes contact with the inner surface 9 of the CGT outer wall 11 at two different points on the sleeve 1. A projection 13 from sleeve 1 makes contact with the inner surface 9. The contact point between the inner surface 9 and the projection 13 has an o-ring seal 45. The lower portion of the sleeve 1 terminates at an end cap 15, whose sides also contact the inner surface 9. The contact point between the inner surface 9 and the end cap 15 is also sealed by an o-ring 45.

Sleeve 1 has inlet port 17 and one or more outlet ports 19, which directly attach to a pump 21. Inlet port 17 accepts a pressurized liquefied gas, such as liquid carbon dioxide or a cryogenic fluid like liquid nitrogen, from the pump 21. (A cryogenic fluid is a liquid which boils at temperatures of less than about 110 degrees K at atmospheric pressure, such as hydrogen, helium, nitrogen, oxygen, air or methane.) The pressurized liquefied gas flows from port 17 through the body 23 of the sleeve 1 to a higher pressure chamber 25 surrounded by sleeve leg 27. At the lower end of the higher pressure chamber 25, the pressurized liquefied gas escapes into the lower pressure chamber 29 through the escape holes 31. Lower pressure chamber 29 is formed between CGT outer wall 11 and sleeve leg 27. In lower pressure chamber 29 the pressurized liquefied gas rapidly evaporates and expands into a gaseous fluid by absorbing energy from the CGT outer wall 11, forming a chilling zone between o-rings 45. The gaseous fluid in the lower pressure chamber 29 can be evacuated at a controllable rate through the outlet port 19, thereby controlling the temperature and diameter of the CGT outer wall 11. The gaseous fluid discharged through outlet port 19 can be re-pressurized into a liquid state and recirculated to higher pressure chamber 25 via pump 21.

When the gaseous fluid is first introduced into the lower pressure chamber 29, the CGT outer wall 11 freezes and therefore its diameter is reduced. As the gaseous fluid is progressively evacuated, the outer wall 11 becomes increasingly warmer and the outer wall diameter will grow. The diameter of CGT outer wall 11 is greater than the diameter of a closure head hole 7 at ambient temperature. The CGT 3 can be situated in a closure head hole 7 when the gaseous fluid is first introduced because the diameter of the CGT outer wall is reduced and becomes smaller than the diameter of the closure head hole 7. However, once the gaseous fluid is slowly evacuated from the lower pressure chamber 29, the diameter of the CGT outer wall 11 will increase in size until an interference fit is established between the outer wall 11 and the closure head hole 7.

For removal of the CGT 3 from the closure head hole 7, the diameter of CGT outer wall 11 must be reduced again since there is an interference fit between the outer wall and the closure head hole. Therefore, the same procedure for inserting the CGT 3 into the closure head hole may be used for removal. A pressurized liquefied gas may be injected into the high pressure chamber 25 and converted to gaseous fluid in the lower pressure chamber 29, shrinking the diameter size of the outer wall 11, so that the CGT 3 can be easily removed from the closure head hole 7.

Figure 3:
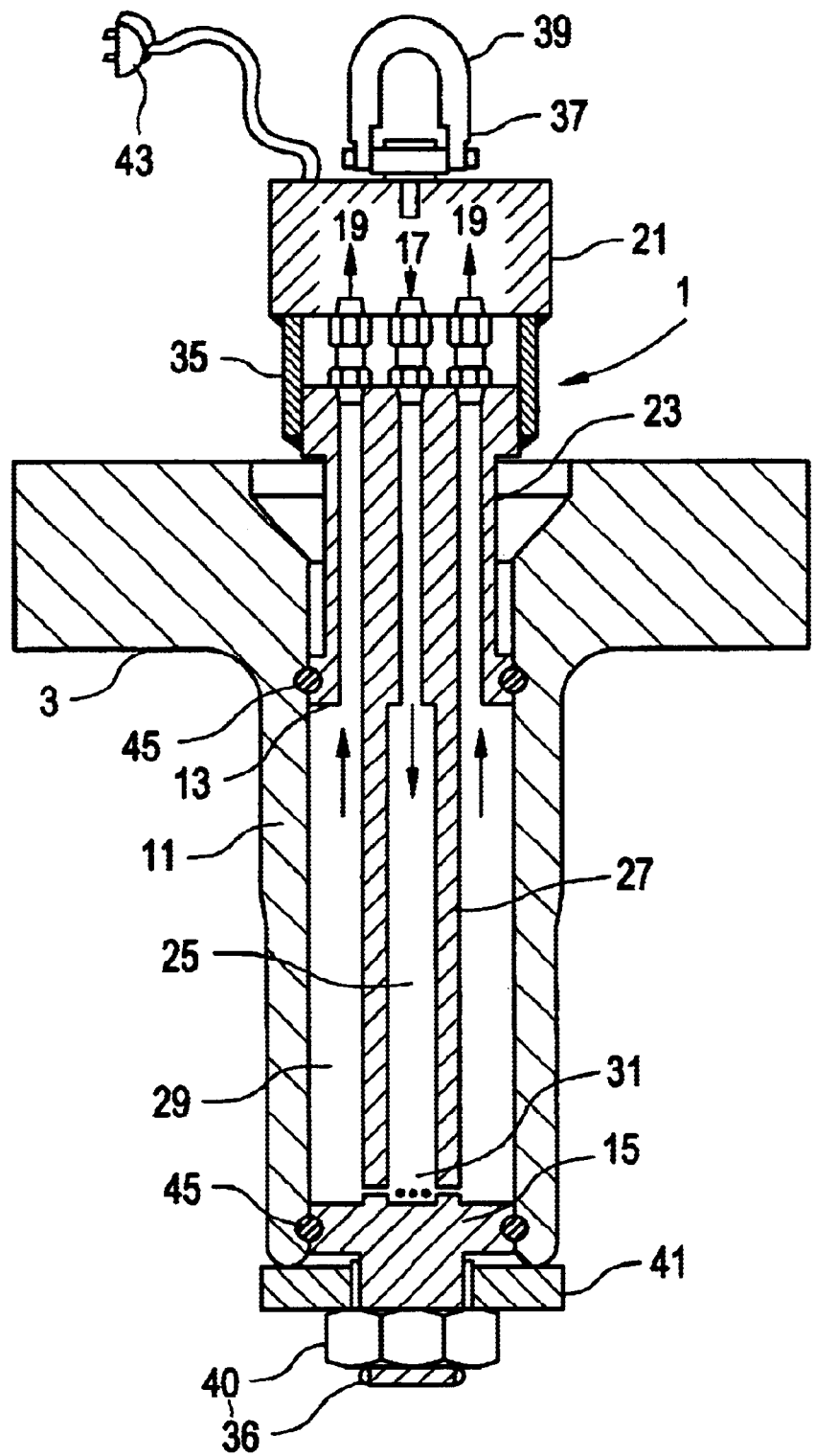
FIG. 3 is a side cross-sectional view of a chilling sleeve with a lifting device.

The sleeve 1 can also easily be inserted into the CGT 3 or removed from the CGT 3 after use with the assistance of a lifting device, as shown in FIG. 3. In the alternative embodiment shown in FIG. 3, the sleeve 1 has an end cap 15 fitted with a threaded projection 36. A retaining collar 41 fits over the threaded projection 36. Retaining collar 41 is in contact with the CGT 3 and is held in place by a nut 40. The sleeve 1 has a connecting structure 35 attached to the body 23 of sleeve 1 and is also attached to the pump 21. The pump 21 may be attached to a lifting device 37 containing a handle 39. Sleeve 1 also has one or more projections 13 and an end cap 15 in this alternative embodiment, which each make contact with the inner surface of the CGT outer wall 11 via an o-ring seal 45.

The pump 21 which controls the circulation through the inlet and outlet ports may be directly attached to the ports as shown in FIG. 1, or may be remotely located and attached to the ports by tubing or other similar connection. The pump may be battery operated or controlled by AC power via a power plug 43 that can be inserted into an electrical power outlet.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles. For example, the invention is generally applicable to inserting a hollow cylinder into a bore hole or another cylinder having a smaller diameter. The invention could therefore be used to insert sleeves or plugs into tubes to repair tube leaks.

I claim:

1. A portable chilling sleeve for controlling the temperature of a hollow cylinder having an outer wall and an inner surface, thereby adjusting the size of the diameter of the outer wall, comprising:

an upper body having a sleeve leg insertable into said hollow cylinder, the upper body having inlet and outlet ports, wherein said body has a projection and a lower end cap, which in operation contact said outer walls of said hollow cylinder, the projection and lower end cap each having an o-ring seal for preventing leaks;

a higher pressure chamber formed within the sleeve leg and in fluid communication with the inlet port;

a lower pressure chamber, formed in operation between the sleeve leg and the inner surface of said hollow cylinder, the lower pressure chamber separated from said higher pressure chamber by escape holes in the sleeve leg and in fluid communication with the outlet port; and pump means for regulating intake into said inlet port and exhaust out of said outlet port, wherein said rate of exhaust release controls the temperature and size of the outer wall of said hollow cylinder.

2. A portable chilling sleeve according to claim 1, wherein said intake is a liquefied gas.

3. A portable chilling sleeve according to claim 2, wherein said intake is a cryogenic liquid.

4. A portable chilling sleeve according to claim 2, wherein said intake is high pressure liquid nitrogen and said exhaust is gaseous nitrogen.

5. A portable chilling sleeve according to claim 2, wherein said intake is liquefied carbon dioxide.

6. A portable chilling sleeve according to claim 1, wherein a handle is attached to a top portion of said sleeve body so that said sleeve can be lifted up and out of said hollow cylinder.

7. A portable chilling sleeve according to claim 1, wherein said pump means is remotely operated from said inlet and outlet ports.

8. A portable chilling sleeve for reversibly reducing the outside diameter of a control rod drive mechanism guide tube, the guide tube having an inner wall with an inner surface, comprising:

an upper body having a sleeve leg insertable into said guide tube, said body having an inlet port in fluid communication with an inlet channel within said body, said inlet channel connected to a higher pressure chamber surrounded by said sleeve leg;

a lower pressure chamber located in operation between said sleeve leg and the inner surface of said guide tube, the lower pressure chamber separated from said higher pressure chamber by escape holes and in fluid communication with an outlet port in said upper body; and pump means for regulating intake into said inlet port and exhaust out of said outlet port, wherein said rate of exhaust release controls the size of the outside diameter of said guide tube.

9. A portable chilling sleeve according to claim 8, wherein said sleeve leg has a projection and a lower end cap, which in operation contact said outer walls of sold guide tube, the projection and lower end cap each having an o-ring seal for preventing leaks.

10. A portable chilling sleeve according to claim 8, wherein said intake is a liquefied gas.

11. A portable chilling sleeve according to claim 10, wherein said intake is a cryogenic liquid.

12. A portable chilling sleeve according to claim 10, wherein said intake is high pressure liquid nitrogen and said exhaust is gaseous nitrogen.

13. A portable chilling sleeve according to claim 10, wherein said intake is liquefied carbon dioxide.

14. A portable chilling sleeve according to claim 8, wherein a handle is attached to a top portion of said sleeve body so that said sleeve can be lifted up and out of said hollow cylinder.

15. A portable chilling sleeve according to claim 8, wherein said pump means is remotely operated from said inlet and outlet ports.

16. A method of inserting a control rod drive mechanism guide tube through a hole in the closure head of a reactor pressure vessel, the hole having a hole diameter and the guide tube having an outer wall with an inner surface and an outer diameter greater than the hole diameter, comprising:

providing a chilling sleeve with an upper body having a sleeve leg insertable into the guide tube, the body having an outlet port, an inlet port in fluid communication with a higher pressure chamber within the sleeve leg, the sleeve leg having a projection surrounded by a first o-ring seal, an end cap surrounded by a second o-ring seal, and escape holes located between the first and second o-ring seals adjacent the end cap;

inserting the chilling sleeve into the guide tube to form a lower pressure chamber between the sleeve leg and the inner surface of the guide tube, the lower pressure chamber in fluid communication with the higher pressure chamber via the escape holes and in fluid communication with the outlet port;

introducing a liquefied gas into the higher pressure chamber via said inlet port and directing the liquefied gas into the lower pressure chamber via the sleeve leg escape holes;

evaporating the liquefied gas in the lower pressure chamber to form a gaseous fluid thereby cooling the inner surface of the guide tube and reducing the outer diameter of the guide tube to a size less than the hole diameter;

discharging the gaseous fluid from the lower chamber via the outlet port; and inserting the guide tube into the hole in the closure head.

17. The method of claim 16, further comprising stopping the introduction of liquefied gas, thereby increasing the outer diameter of the guide tube.

18. The method of claim 16, further comprising repressurizing the discharged gaseous fluid to form a liquefied gas and recycling the repressurized liquefied gas back to the inlet port.

* * * * *